US012681477B2

(12) United States Patent
Pyke et al.

(10) Patent No.: US 12,681,477 B2
(45) Date of Patent: Jul. 14, 2026

(54) DETECTION OF TRAILING CABLES FOR SURFACE MINING EQUIPMENT

(71) Applicant: Caterpillar Inc., Peoria, IL (US)

(72) Inventors: Sandy Pyke, St.-Constant (CA); Francois Gariepy, St.-Colomban (CA); Aurelien Nie-Rouquette, Montreal (CA)

(73) Assignee: Caterpillar Inc., Peoria, IL (US)

( * ) Notice: Subject to any disclaimer, the term of this patent is extended or adjusted under 35 U.S.C. 154(b) by 349 days.

(21) Appl. No.: 18/214,293

(22) Filed: Jun. 26, 2023

(65) Prior Publication Data

US 2024/0427331 A1     Dec. 26, 2024

(51) Int. Cl.
*G05D 1/00*          (2024.01)

(52) U.S. Cl.
CPC ......... *G05D 1/0214* (2013.01); *G05D 1/0022* (2013.01); *G05D 1/0219* (2013.01)

(58) Field of Classification Search
CPC ... G05D 1/0214; G05D 1/0022; G05D 1/0219
See application file for complete search history.

(56) References Cited

U.S. PATENT DOCUMENTS

| | | | |
|---|---|---|---|
| 4,994,747 A | 2/1991 | Stolarczyk | |
| 5,371,959 A | 12/1994 | Ahs | |

| | | | |
|---|---|---|---|
| 5,576,973 A * | 11/1996 | Haddy | G01V 3/15 |
| | | | 342/357.52 |
| 8,749,385 B2 * | 6/2014 | Bernhard | B62B 5/0423 |
| | | | 340/540 |
| 9,594,183 B2 | 3/2017 | Branson | |
| 10,423,870 B2 * | 9/2019 | Buchsbaum | H04B 5/266 |
| 10,992,343 B1 | 4/2021 | Willis, III et al. | |
| 11,368,207 B1 * | 6/2022 | Thatcher | G05B 19/042 |

FOREIGN PATENT DOCUMENTS

| | | |
|---|---|---|
| EP | 2362241 A1 | 8/2011 |
| WO | 0104427 A1 | 1/2001 |

OTHER PUBLICATIONS

Xu Sun et al. "Underground Power Cable Detection and Inspection Technology Based on Magnetic Field Sensing at Ground Surface Level." IEEE Transactions on Magnetics, vol. 50, No. 7, Jul. 2014. 5 pages.

* cited by examiner

*Primary Examiner* — Franklin D Balseca

(57)          ABSTRACT

On industrial sites, especially sites which utilize remotely operated or autonomous mobile equipment, there is a significant risk that the mobile equipment may inadvertently contact trailing or buried cables. Traditional cable detection systems are unable to detect three-phase AC power trailing cables. Disclosed embodiments eliminate or reduce the risk of inadvertently contacting such cables. In particular, a signal may be injected into the pilot wire of each cable by a transmitter. A receiver on the mobile equipment may detect this signal on the pilot wire within a cable, and initiate an alert in response to detecting a signal.

20 Claims, 6 Drawing Sheets

300

310

Start

Signal
?

No

Yes

320

Demodulate signal into data stream

330

Matches
reference
?

No

Yes

340

Initiate alert

DETECTION OF TRAILING CABLES FOR SURFACE MINING EQUIPMENT

TECHNICAL FIELD

The embodiments described herein are generally directed to detecting cables, and, more particularly, to detecting trailing cables for mobile equipment at an industrial site, such as a mining site.

BACKGROUND

Surface mining and excavation equipment can potentially encounter underground cables due to the nature of their operations. These cables can be power lines, communication lines, or other utility cables buried beneath the ground. In addition, some equipment, such as surface mining equipment, may be powered by a trailing cable. The risk of damaging these cables is a serious concern, as damage to the cables can pose safety hazards, disrupt operations, and result in costly repairs.

Traditionally, the detection of single-phase alternating current (AC) power cables is accomplished by detecting the change in current in the cable as the AC voltage rises and falls. However, trailing cables use three-phase AC power. The net current change in three-phase AC power cables is zero. This renders standard electromagnetic detection ineffective.

In some industrial contexts, such as construction, mining, farming, forestry, and the like, mobile equipment may operate in remote locations, such as rural areas, where power lines or utility services may not be clearly visible and accounted. Generally, utility companies have underground utility maps that may not be updated or lack reliability. Therefore, significant time and equipment are required to detect hidden utility infrastructure. However, currently available equipment cannot detect the presence of 5-7 kilovolt (kV) three-phase AC power cables.

Accordingly, a method of detecting cables, prior to inadvertent contact by mobile equipment, would offer a variety of benefits, including improved safety, fewer disruptions, and less repair cost. U.S. Pat. No. 9,594,183, 8,183,867, and International Patent Pub. No. WO 01/04427 describe examples of detection systems. For example, U.S. Pat. No. 9,594,183 describes the detection of buried services by introducing a detection signal to the buried services. The present disclosure is directed toward overcoming one or more of the problems discovered by the inventors.

SUMMARY

In an embodiment, a cable detection system comprises: one or more antennas installed on a mobile equipment, wherein each of the one or more antennas is configured to detect a signal within a frequency range; and a receiver configured to, when any of the one or more antennas detect the signal, demodulate the detected signal into a data stream, determine whether or not the data stream matches a reference, and when determining that the data stream matches the reference, initiate an alert.

In an embodiment, a method for detecting cables, the method comprises: by at least one transmitter of at least one substation at an industrial site, transmitting a signal within a frequency range on a pilot wire of a cable, wherein the signal comprises a data stream; and by at least one receiver on a mobile equipment operating at the industrial site, detecting the signal via at least one antenna on the mobile equipment, demodulating the detected signal into the data stream, determining whether or not the data stream matches a reference, and when determining that the data stream matches the reference, initiating an alert.

In an embodiment, a cable detection system comprises: one or more antennas installed on a mobile equipment, wherein each of the one or more antennas is configured to detect a signal; and a receiver comprising a demodulator that is configured to demodulate the detected signal into a data stream, and a microprocessor configured to attempt to detect a preamble in the data stream, when not detecting the preamble in the data stream, determine that the data stream does not match a reference, when detecting the preamble in the data stream, extract a data frame from the data stream based on the preamble, extract an identifier from the data frame, compare the identifier to a reference identifier, when the identifier matches the reference identifier, determine that the data stream matches the reference, and when the identifier does not match the reference identifier, determine that the data stream does not match the reference, and when determining that the data stream matches the reference, initiate an alert.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
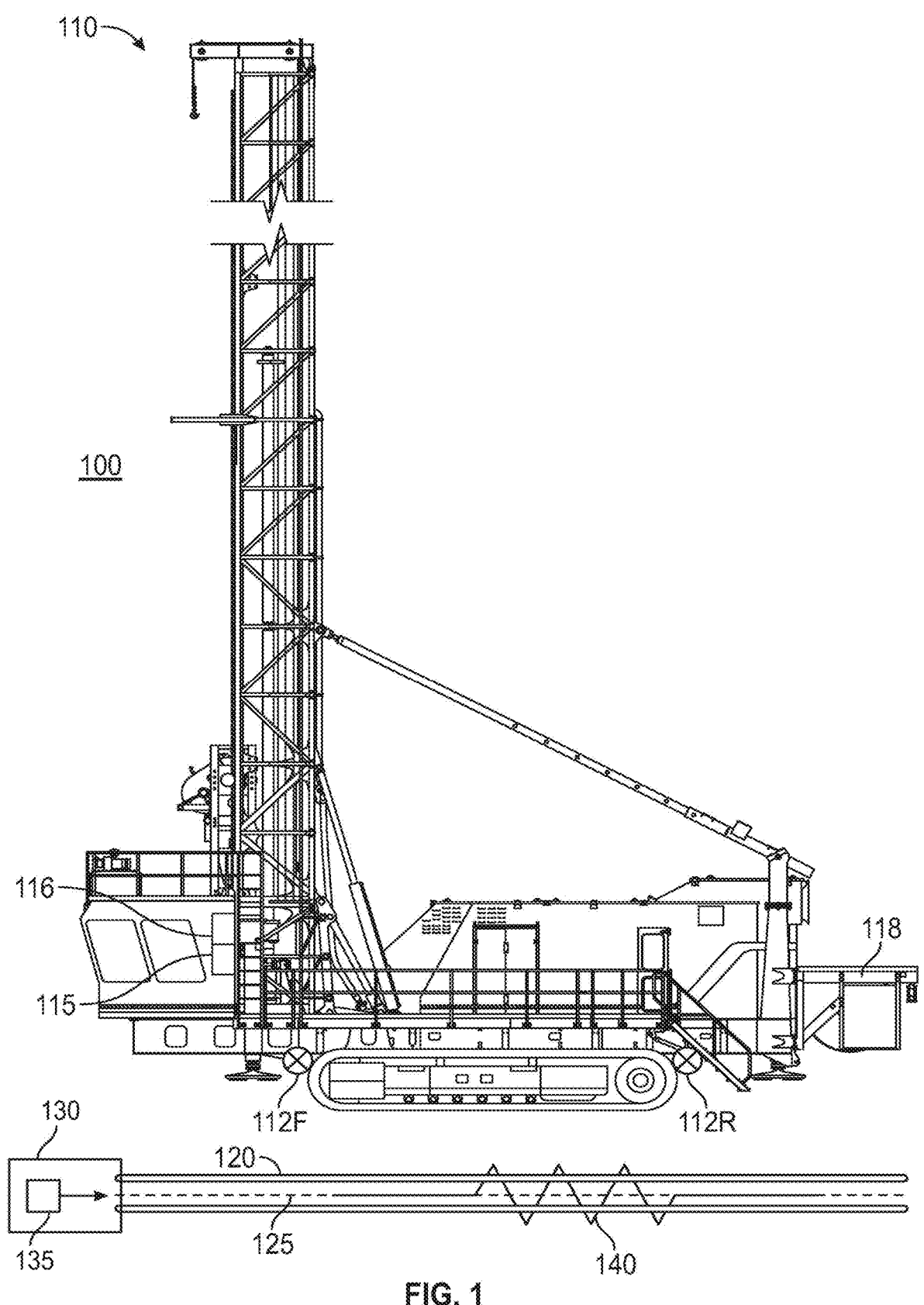
FIG. 1 illustrates an industrial environment in which a cable detection system may operate, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description. In addition, it should be understood that the various components illustrated herein are not necessarily drawn to scale. In other words, the features disclosed in various embodiments may be implemented using different relative dimensions within and between components than those illustrated in the drawings.

FIG. 1 illustrates an industrial environment 100 in which a cable detection system may operate, according to an embodiment. The cable detection system, which may comprise one or more antennas 112 and one or more receivers 115, may be installed and operated for use with mobile equipment 110 that comprises one or more ground-engaging members, such as tracks or wheels. It is generally contemplated that mobile equipment 110 would be surface mining equipment, such as a drill. Examples of drills include any of the rotary drills (e.g., MD6240, MD6290, MD6420C, MD6540, MD6540C, MD6640, etc.) or track drills (e.g., MD5075C, MD5150C, etc.) manufactured by Caterpillar Inc. of Irving, Texas. However, mobile equipment 110 may be any type or model of equipment that is at risk of contacting an electrical cable, especially in an industrial site in which construction, mining, agriculture, forestry, paving, and/or the like are performed. Other examples of mobile equipment 110 include, without limitation, an excavator, wheel loader, dump truck, asphalt paver, backhoe loader, skid steer, track loader, cold planer, compactor, dozer, electric rope shovel, forest machine, hydraulic mining shovel, material handler, motor grader, pipe-layer, road reclaimer, telehandler, tractor-scraper, or the like. Mobile equipment 110 may be a tethered electric-powered equipment, or may be equipment that operates in the vicinity of tethered electric-powered equipment. Mobile equipment 110 may be operated by a human (e.g., locally or remotely) or by an autonomous system.

Mobile equipment 110 may be tethered to a power supply by a trailing cable. For example, mobile equipment 110 may comprise a cable reel 118 on or near the rear of mobile equipment 110. Cable reel 118 may hold a trailing cable, as cable 120, that is electrically coupled to a substation 130. In this case, cable 120 may be spooled onto cable reel 118 and unspooled from cable reel 118. Substation 130 supplies mobile equipment 110 with power via cable 120. Alternatively, cable 120 may be a trailing cable of another mobile equipment operating on the industrial site, another type of surface cable, or an underground cable.

Cable 120 comprises a pilot wire 125 (e.g., along its longitudinal axis). Pilot wire 125 is normally used by a monitoring system at a substation 130, which supplies power to cable 120, to detect when cable 120 becomes disconnected and, when detecting a disconnection, cut power to cable 120. Pilot wire 125 may be made of copper or aluminum conductors. The specific materials used for pilot wire 125 may vary depending on the application, voltage rating, environmental conditions, and regulatory requirements.

Substation 130 comprises a transmitter 135. Transmitter 135 is conductively coupled to pilot wire 125, and configured to introduce a signal 140 into pilot wire 125. Transmitter 135 converts an input signal into a suitable signal 140 for transmission over pilot wire 125. Transmitter 135 may act as a modulator that varies one or more properties (e.g., amplitude, frequency, phase, etc.) of a carrier signal, with a modulation signal. In an embodiment, transmitter 135 transmits signal 140 within a frequency range of 90-110 kHz, more preferably in the range of 95-105 kHz, and most preferably 100 kHz or at least 100 kHz. However, signal 140 may be transmitted with any frequency that is detectable by the cable detection system on mobile equipment 110. It is contemplated that cable 120, which may be a trailing cable, is intended for power transmission, rather than signal transmission. Therefore, the characteristic impedance should be taken into account, to allow for good propagation of signal 140 on pilot wire 125.

The modulation signal that is encoded into signal 140 may contain a stream of data consisting of identical fixed-length data frames (e.g., N-bit frames, such as 80-bit, 100-bit, etc. frames). In an embodiment, transmitter 135 utilizes on-off keying (OOK) modulation or another amplitude-shifting keying (ASK) modulation that represents the data stream as the presence or absence of the carrier wave. In a simple form of OOK modulation, the presence of the carrier wave for a specific duration represents a binary one, and the absence of the carrier wave represents a binary zero. Each data frame in the data stream may comprise a preamble and a payload. The payload may include an identifier, such as a 32-bit OOK direct current (DC)-balanced identifier. Signal 140 carries the data stream, comprising or consisting of the data frames, over pilot wire 125.

The goal of mobile equipment 110 is to avoid contacting each cable 120 on the industrial site. Cable(s) 120 may be buried underground or, if a trailing cable, may be lying on the ground surface, but obscured by dirt, dust, debris, foliage, snow, and/or the like. Notably, operation of mobile equipment 110 by a remote operator or by an autonomous system may increase the risk of contacting a cable 120, since cable 120 may not be visible to an imaging system that supplies video to the remote operator or computer vision to the autonomous system.

The cable detection system, onboard mobile equipment 110, may comprise one or a plurality of antennas, illustrated as at least one antenna 112F on the front of mobile equipment 110 and at least one antenna 112R on the rear of mobile equipment 110. As used herein, the term "antenna 112" (i.e., without an appended letter), may refer to either antenna 112F or 112R, and the term "antennas 112" may refer collectively to antennas 112F and 112R. In addition, the cable detection system may comprise at least one receiver 115 that is communicatively coupled to the antenna(s) 112, so as to receive any signal detected by the antenna(s) 112. Receiver 115 may be communicatively coupled to or integrated into a controller 116, which may be an electronic control unit (ECU) of mobile equipment 110.

Antenna(s) 112 may be positioned in strategic locations on mobile equipment 110 to maximize the accuracy and range of detection of signal 140 traveling along pilot wire 125, as well as to detect cable 120 when cable 120 is in a position, relative to mobile equipment, at which cable 120 is most likely to be inadvertently contacted. For example, a first antenna 112F may be positioned on or near the front of mobile equipment 110 (e.g., near a work implement of mobile equipment 110, such as a drill, bucket, etc., in front of or between the tracks or front wheels) and/or a second antenna 112R may be positioned on the rear of mobile equipment 110 (e.g., behind or between the tracks or rear wheels). In an embodiment, a pair of first antennas 112F are positioned on or near the front of mobile equipment (e.g., in front of both tracks or front wheels), and/or a pair of second antennas 112R are positioned on or near the rear of mobile equipment (e.g., behind both tracks or rear wheels). The detection range of each antenna 112 may be 1-3 meters.

Each antenna 112 is configured to detect a signal within the frequency range of signal 140. In particular, each antenna 112 is configured to receive electromagnetic waves from pilot wire 125 and convert the electromagnetic waves into an electrical signal representing signal 140. Antenna 112 serves as the interface between mobile equipment 110 and signal 140. In an embodiment, antenna 112 comprises a loop antenna or other antenna that is capable of detecting signal 140, regardless of the orientation of cable 120 (e.g., parallel or perpendicular) with respect to mobile equipment 110. Other examples of antenna 112 include, without limitation, a parabolic antenna, Yagi-Uda antenna, horn antenna, patch antenna, helical antenna, log-periodic antenna, and the like.

Each antenna 112, or at least antenna(s) 112 within a detection range from cable reel 118, may be shielded from cable reel 118, so as to prevent the detection by antenna(s) 112 of spooled cable 120 on cable reel 118. For example, cable reel 118 may comprise sufficient shielding around the spooled cable 120 to prevent propagation of signal 140 from the spooled cable 120 to any of antenna(s) 112. Cable reel 118 acts as a large inductor. Utilization of a loop antenna as antenna(s) 112, not only allows for directionality of the signal detection, but may also eliminate some of the interference caused by cable reel 118.

When antenna 112 on mobile equipment 110 is within a detectable range of pilot wire 125, antenna 125 will begin detecting signal 140 through pilot wire 125. As antenna 112 approaches cable 120, and pilot wire 125 therein, the strength of signal 140 detected by antenna 112 may increase. Antenna 112 provides the detected signal to an input of receiver 115. Antenna 112 is designed to be sensitive to the specific frequency or frequencies of signal 140. As signal 140 propagates along pilot wire 125, an antenna 112 near cable 120 will receive the energy of signal 140 and detect its variations in amplitude, frequency, and/or phase.

Receiver 115 may extract the data stream from signal 140. For example, receiver 115 may demodulate the detected signal, thereby separating the modulation signal from the carrier signal. It should be understood that this demodulation is the reverse of the modulation (e.g., OOK modulation) performed by transmitter 135. The separated signal can then be decoded to reproduce the original data stream by, for example, detecting the preamble in the data stream, and extracting one or more data frames based on the detected preamble. The data stream may then be compared to a reference. In particular, the identifier in the payload of the extracted data frame(s) may be compared to a reference identifier. When the data stream matches the reference, receiver 115 may initiate an alert to controller 116. Based on the position of the antenna 112 that detected signal 140, receiver 115 may also include an indication of the position (front, rear, front-left, front-right, rear-left, rear-right, etc.) of cable 120 in the alert. Upon receiving the alert, controller 116 may alert an operator or autonomous system of the nearby cable 120. The alert may trigger an interlock of mobile equipment 110 (e.g., preventing movement of a work implement of mobile equipment 110, preventing movement of the ground-engaging members of mobile equipment 110, and/or the like) to prevent accidental contact with cable 120.

Figure 2:
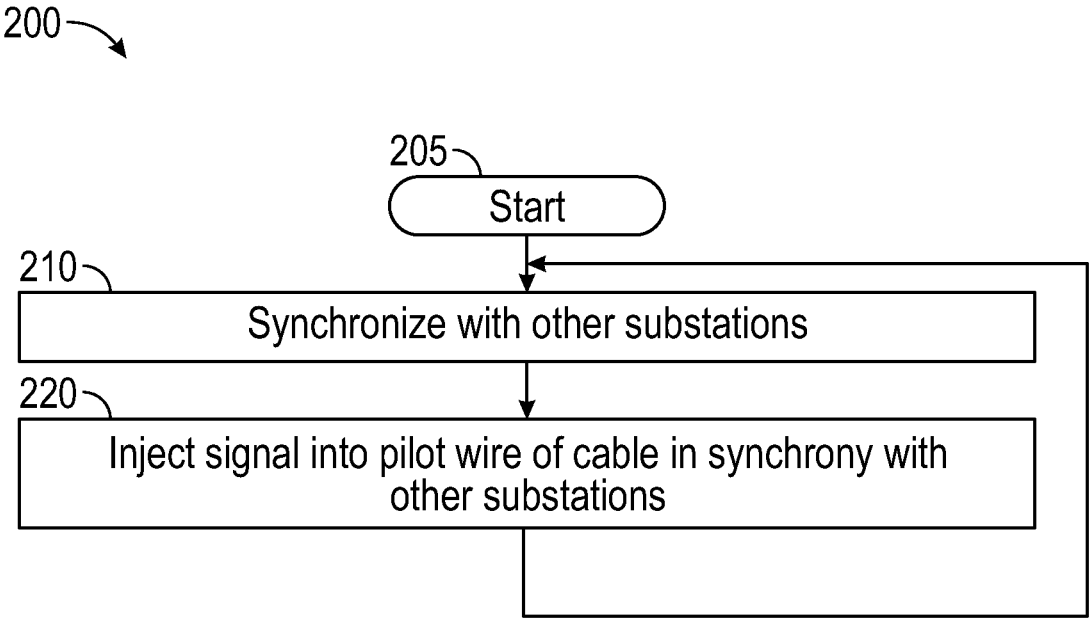
FIG. 2 illustrates a transmission process for detecting cables, according to an embodiment.

FIG. 2 illustrates a transmission process 200 for detecting cables 120, according to an embodiment. Process 200 may be implemented continuously by each transmitter 135 in a substation 130 that supplies power to cable 120. One transmitter 135 may transmit signal 140 on pilot wire 125 of a single cable 120 or a plurality of cables 120. A substation 130 may consist of a single transmitter 135 or comprise a plurality of transmitters 135.

In subprocess 210, transmitter 135 may synchronize with other transmitters 135, for example, in other substations 130. In particular, to eliminate the risk of interference caused by a plurality of transmitters 135, all transmitting signals 140 along pilot wires 125 of a plurality of cables 120, a synchronization mechanism may be used by all transmitters 135 to synch each transmitter's generation of signal 140 with each other transmitter's generation of signal 140. This enables the detection of a cable 120, even when there are a plurality of cables 120, in parallel, perpendicular, or other angled orientations, relative to each other, on the industrial site. While any appropriate synchronization mechanism may be used, in an embodiment, the Global Positioning System (GPS) or other global navigation satellite system (GNSS) may be used.

In subprocess 220, transmitter 135 injects signal 140 into pilot wire 125 according to the synchronization mechanism. As discussed above, transmitter 135 may be a modulator that encodes a data stream into signal 140. In the case of GPS-based synchronization, each transmitter 135 may transmit in accordance with a GPS-disciplined clock that continually adjusts to the GPS signal. For example, transmitter 135 may receive one pulse per second from the GPS receiver, and transmit signal 140 at each pulse.

The data stream transmitted by each transmitter 135 may comprise a continuous stream of data frames. Each data frame may comprise a preamble and a payload. The payload may comprise an identifier. The identifier does not need to be unique. For example, each transmitter 135 may transmit the same identifier in the payload. In this case, while each cable 120 can be detected by the cable detection system of each mobile equipment 110, the cable detection system may not be able to distinguish one cable 120 from another cable 120. In an alternative embodiment, each transmitter 135 may transmit a unique identifier in the payload. In this case, the cable detection system of each mobile equipment 110 can distinguish one cable 120 from each other cable 120 based on their unique identifiers. In either case, due to synchronization, the data frames across all cables 120 are aligned with each other.

Figure 3:
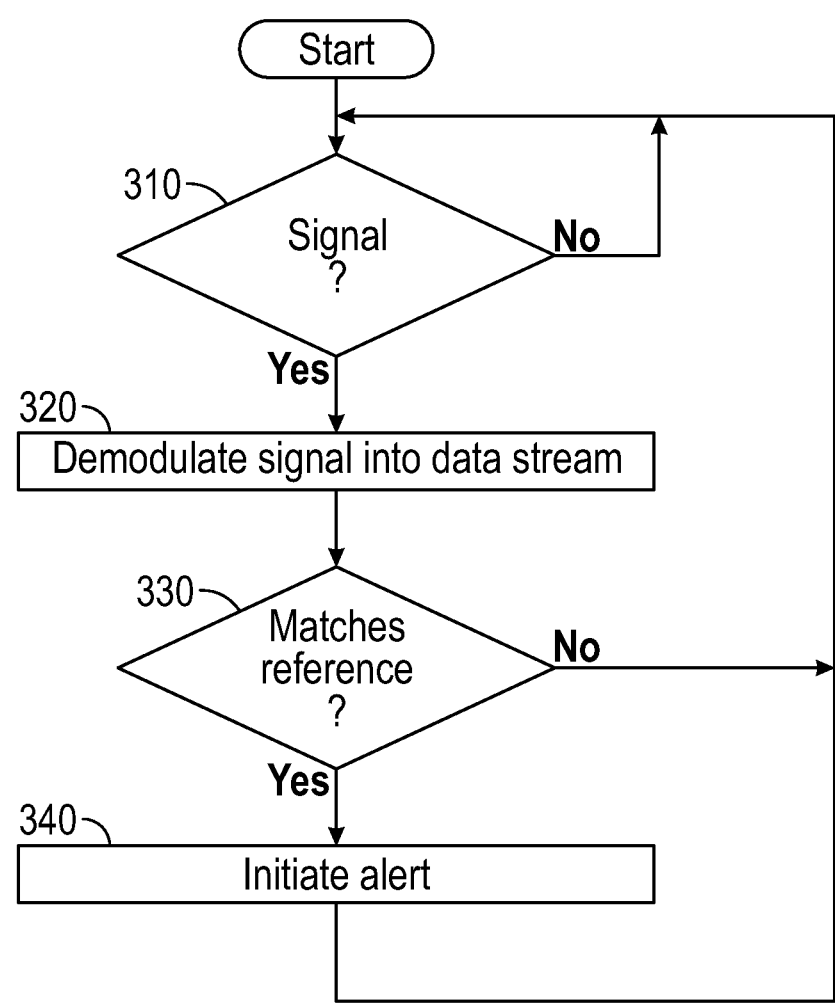
FIG. 3 illustrates a reception process for detecting cables, according to an embodiment.

FIG. 3 illustrates a reception process 300 for detecting cables 120, according to an embodiment. Process 300 may be implemented continuously by each receiver 115 on mobile equipment 110, which may receive signal(s) from one or more antennas 112 mounted on mobile equipment 110. Alternatively, process 400 may be implemented continuously by controller 116 based on the output of a receiver 115 or an array of receivers 115.

In subprocess 310, process 300 determines whether or not a signal has been detected by receiver 115. Receiver 115 will detect signal 140 whenever an antenna 112 on mobile equipment 110 is within a detectable range from a pilot wire 125 carrying signal 140. When any of the antenna(s) 112 detect a signal (i.e., "Yes" in subprocess 310), process 300 proceeds to subprocess 320. Otherwise, when no signal is detected by any antenna(s) 112 (i.e., "No" in subprocess 310), process 300 continues to wait for a signal detection.

In subprocess 320, receiver 115 demodulates the detected signal into a data stream. It should be understood that subprocess 320 is the reverse of subprocess 220. Thus, if transmitter 135 modulates using a particular modulation scheme (e.g., OOK), receiver 115 demodulates the signal using the same modulation scheme (e.g., OOK). The demodulation produces a data stream.

In subprocess 330, the data stream, produced by subprocess 320, may be compared to one or more references to determine whether or not the data stream matches a reference. In particular, subprocess 330 may attempt to detect a preamble in the data stream, for example, by comparing series of bits in the data stream to a reference preamble stored in memory used by process 300 (e.g., memory of receiver 115 or controller 116). When the preamble is not detected in the data stream, subprocess 330 may determine that the data stream does not match the reference (i.e., "No" in subprocess 330). When the preamble is detected in the data stream, subprocess 330 may extract a data frame from the data stream based on the preamble. In particular, the detected preamble may be used to identify the start and/or end of the data frame.

Subprocess 330 may then determine whether or not the extracted data frame matches a reference. In particular, each data frame may comprise a payload, which may include an identifier (e.g., 32-bit OOK DC-balanced identifier). Sub-process 330 may extract the identifier from the payload of the extracted data frame, and compare the extracted identi-fier to one or a plurality of reference identifiers stored in the memory used by process 300. When the identifier matches a reference identifier, subprocess 330 may determine that the data frame matches the reference (i.e., "Yes" in subprocess 330). Otherwise, when the identifier does not match any reference identifier, subprocess 330 may determine that the data frame does not match the reference (i.e., "No" in subprocess 330).

In an embodiment, the identifier is only used to differen-tiate the detected signal 140 from noise. In such an embodi-ment, the identifier does not need to be unique for each cable 120. Rather, each transmitter 135 may transmit the same identifier, in which case, process 300 only needs to store this single emitted identifier as the reference identifier. When the extracted identifier matches a reference identifier (i.e., "Yes" in subprocess 330), process 300 knows that the detected signal is signal 140 and not noise, and therefore, proceeds to subprocess 340. Otherwise, when the extracted identifier does not match a reference identifier (i.e., "No" in subpro-cess 330), process 300 knows that the detected signal is not signal 140, and returns to subprocess 310 to continue monitoring for cables 120.

In subprocess 340, process 300 initiates an alert in response to detecting signal 140. In this case, an antenna 112 is close enough to a cable 120 that it can detect signal 140, which means that mobile equipment 110 is at risk of contacting cable 120. If process 300 is implemented by receiver 115, subprocess 340 may comprise sending an output signal (e.g., an Alert signal, as described elsewhere herein) to controller 116. If process 300 is implemented by controller 116, subprocess 340 may comprise generating the alert directly or communicating with another system of mobile equipment 110.

The alert may comprise a visual, audio, and/or haptic warning to a local operator (e.g., in a cabin of mobile equipment 110) or a remote operator (e.g., at a remote terminal). Alternatively or additionally, the alert may com-prise a communication with an autonomous system of mobile equipment 110. In this case, the autonomous system may interlock mobile equipment 110. In particular, the autonomous system may prohibit further movement of a work implement (e.g., drill, bucket arm, shovel, etc.) of mobile equipment 110, prohibit further movement of one or more ground-engaging members (e.g., tracks or wheels) of mobile equipment 110, and/or the like, until a remedial action is performed. The remedial action may include a manual input indicating that the risk of contact has been eliminated (e.g., operation of a button, switch, etc. by a human operator), separation of mobile equipment 110 from the vicinity of cable 120 (e.g., movement of mobile equip-ment 110 and/or cable 120 away from each other until antenna 112 no longer detects signal 140), and/or the like. After subprocess 340 or after the interlock is resolved via remedial action, process 300 may return to subprocess 310 to continue monitoring for a cable 120.

Figure 4:
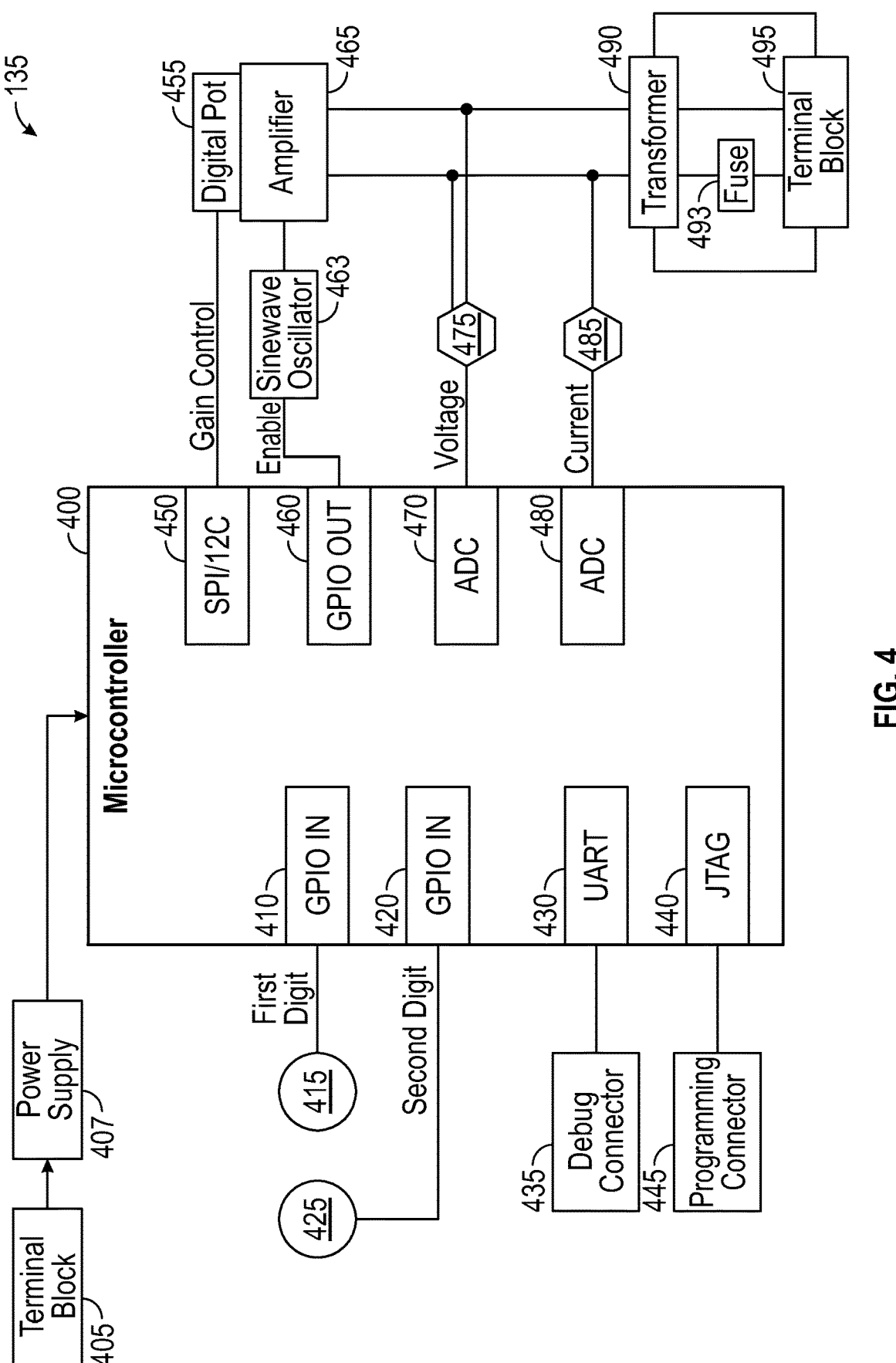
FIG. 4 illustrates a transmitter for injecting a signal into a cable, according to an embodiment.

FIG. 4 illustrates a transmitter 135 for injecting a signal 140 into a cable 120, according to an embodiment. Although only a certain number of each component of transmitter 135 is illustrated, it should be understood that transmitter 130 may comprise any number of each component, including one or any plurality of each component. In addition, one or more of the components may be omitted from transmitter 135 and/or one or more non-illustrated components may be included in transmitter 135. Transmitter 135 may comprise a circuit board, with all or a subset of the other components mounted on or otherwise connected to the circuit board.

Transmitter 135 may comprise a microcontroller 400. Microcontroller 400 may receive input(s) from one or more other components, apply logic to the inputs, and provide the output(s) of that logic to one or more other components. Microcontroller 400 may comprise any of the STM32 series of microcontrollers (e.g., STM32F407) manufactured by or for STMicroelectronics of Geneva, Switzerland. However, it should be understood that this is simply one example, and that any other suitable microcontroller may be used as microcontroller 400. Notably, minimal processing power is required by transmitter 135.

Microcontroller 400 may comprise one or more general purpose input/output (GPIO) inputs, illustrated as first GPIO input 410 and second GPIO input 420, a universal asyn-chronous receiver and transmitter (UART) 430, a Joint Test Action Group (JTAG) interface 440, a serial peripheral interface (SPI)/inter-integrated circuit (SPI/I2C) interface 450, one or more GPIO outputs, illustrated as a single GPIO output 460, and one or more analog-to-digital converters (ADCs), illustrated as first analog-to-digital converter 470 and second analog-to-digital convertor 480.

Transmitter 135 may comprise a terminal block 405 configured to receive input power from an external power source (e.g., from an external AC-DC converter of substa-tion 130). Terminal block 405 provides the input power, through a power supply 407, to microcontroller 400 and other components of transmitter 135, to thereby power transmitter 135. The input power may be provided at 24 Volts (V).

Transmitter 135 may comprise one or more identifier selectors, illustrated as first identifier selector 415 connected to first GPIO input 410 and second identifier selector 425 connected to second GPIO input 420. Each identifier selec-tor may comprise a rotary encoder that can be used to set a digit (e.g., a 16-bit digit) that forms at least a portion of the identifier to be incorporated into the payload of the data frames in the data stream transmitted by transmitter 135 in signal 140. Collectively, the full identifier may be deter-mined by appending the digits set by each identifier selector. For example, to set the identifier to "28," first identifier selector 415 may be set to "2" and second identifier selector 425 may be set to "8." It should be understood that the size of the identifier will be determined by the sum of the sizes of the numbers set by each identifier selector. For example, if each identifier selector 415 and 425 sets a 16-bit digit, the identifier will be 32-bits in length. In an alternative embodi-ment, the identifier may be stored as a constant value in memory of microcontroller 400, in which case the identifier selectors 415 and 425 may be omitted.

Transmitter 135 may comprise a debug connector 435 communicatively coupled to microcontroller 400 via UART interface 430. Debug connector 435 provides an interface for advanced debugging and testing capabilities during devel-opment and troubleshooting stages. In particular, a dedicated debugging tool, such as an in-circuit debugger or emulator, may be connected to debug connector 435, to read internal values and change internal settings of microcontroller 400. As one example, debug connector 435 may comprise a connector manufactured by or for Future Technology Devices International Limited of Glasgow, Scotland, to allow the connection of a laptop or other computing device to transmitter 135. In an alternative embodiment in which debugging is unnecessary or achievable via other means, debug connector 435 may be omitted.

Transmitter 135 may comprise a programing connector 445 communicatively coupled to microcontroller 400 via JTAG interface 440. Programming connector 445 allows for the transfer of compiled software code from the development environment to memory of microcontroller 400 for execution by microcontroller 400. Programming connector 445 may comprise a standard ST-Link connector for programming and in-circuit debugging of microcontroller 400.

Transmitter 160 may comprise a sinewave oscillator 463 communicatively coupled to microcontroller 400 via GPIO output 460. Sinewave oscillator 463 may be configured to generate a pure sinewave. This is generally preferable to a digitally constructed sinewave using a digital-to-analog converter (DAC), since it reduces harmonics. In an embodiment, sinewave oscillator 463 generates a sinewave between 90-110 kHz, and preferably at, around, or at least 100 kHz. However, the sinewave may have any suitable frequency. Sinewave oscillator 463 may be free running. In an embodiment that uses OOK modulation, microcontroller 400 disables the output of sinewave oscillator 463, based on the modulation signal. Since sinewave oscillator 463 may take time to stabilize, it is preferable to disable the output instead of stopping the oscillation. A resistor-capacitor (RC) filter may be connected on the enable line to provide a smooth transition between ON and OFF modulation states. The remote frequency protocol carrier may comprise a 100 kHz signal with OOK modulation, a 320 bps (3.125 ms per symbol) symbol rate, an 80-bit (10-byte) data frame with a repeat having no downtime.

The modulated signal from sinewave oscillator 463 may be amplified by an amplifier 465 before being injected into a transformer 490. Amplifier 465 is configured to take an input signal and amplify the voltage, current, and/or power to a desired level. The gain provided by amplifier 465 may be depend on the length (e.g., loop impedance) of cable 120. Microcontroller 400 can adjust this amplification gain using a digital potentiometer 455 that is communicatively coupled to microcontroller 400 via SPI/I2C interface 450. The gain may be adjusted and monitored to allow for proper coupling of signal 140 into pilot wire 125.

Transmitter 135 may comprise a voltage sensor 475 that measures the voltage of the signal at the output of amplifier 465. In addition, voltage sensor 475 is communicatively coupled to microcontroller 400, via analog-to-digital converter 470. Thus, voltage sensor 475 provides the measured voltage of the signal to microcontroller 400 via analog-to-digital converter 470. In an alternative embodiment, voltage sensor 475 may not be required, and therefore, can be omitted.

Transmitter 135 may comprise a current sensor 485 that measures the current of the signal at the output of amplifier 465. In addition, current sensor 485 is communicatively coupled to microcontroller 400 via analog-to-digital converter 480. Thus, current sensor 485 provides the measured current of the signal to microcontroller 400 via analog-to-digital converter 480. In an alternative embodiment, current sensor 485 may not be required, and therefore, can be omitted.

Transmitter 135 may comprise a transformer 490 that receives the amplified signal, output by amplifier 465. Transformer 490 provides isolation between the hostile high-power environment upstream from transformer 490 and the fragile low-power control circuitry downstream from transformer 490. In an embodiment, the target isolation is 8 kV, but may vary. Transformer 490 can be used for impedance matching, signal isolation, voltage level conversion, and/or the like.

For safety purposes, a fuse 493 may be inserted in the hostile section between transformer 490 and terminal block 495. The value of the current (e.g., a few hundred milliamps) between transformer 490 and terminal block 495 can be defined based on the rating of transformer 490. The primary purpose of fuse 493 is to interrupt the flow of current when it exceeds a safe threshold, thereby preventing damage to transmitter 135 due to excessive current or short circuits. When the current exceeds the rating of fuse 493, the fuse element melts or breaks, opening the circuit and isolating the faulty section. Terminal block 495 outputs the transformed and modulated signal 140 to pilot wire 125. As discussed elsewhere herein, signal 140 may comprise a stream of data frames that each comprise or consist of a preamble and/or a payload that includes an identifier (e.g., as defined by identifier selectors 415 and 425).

Figure 5:
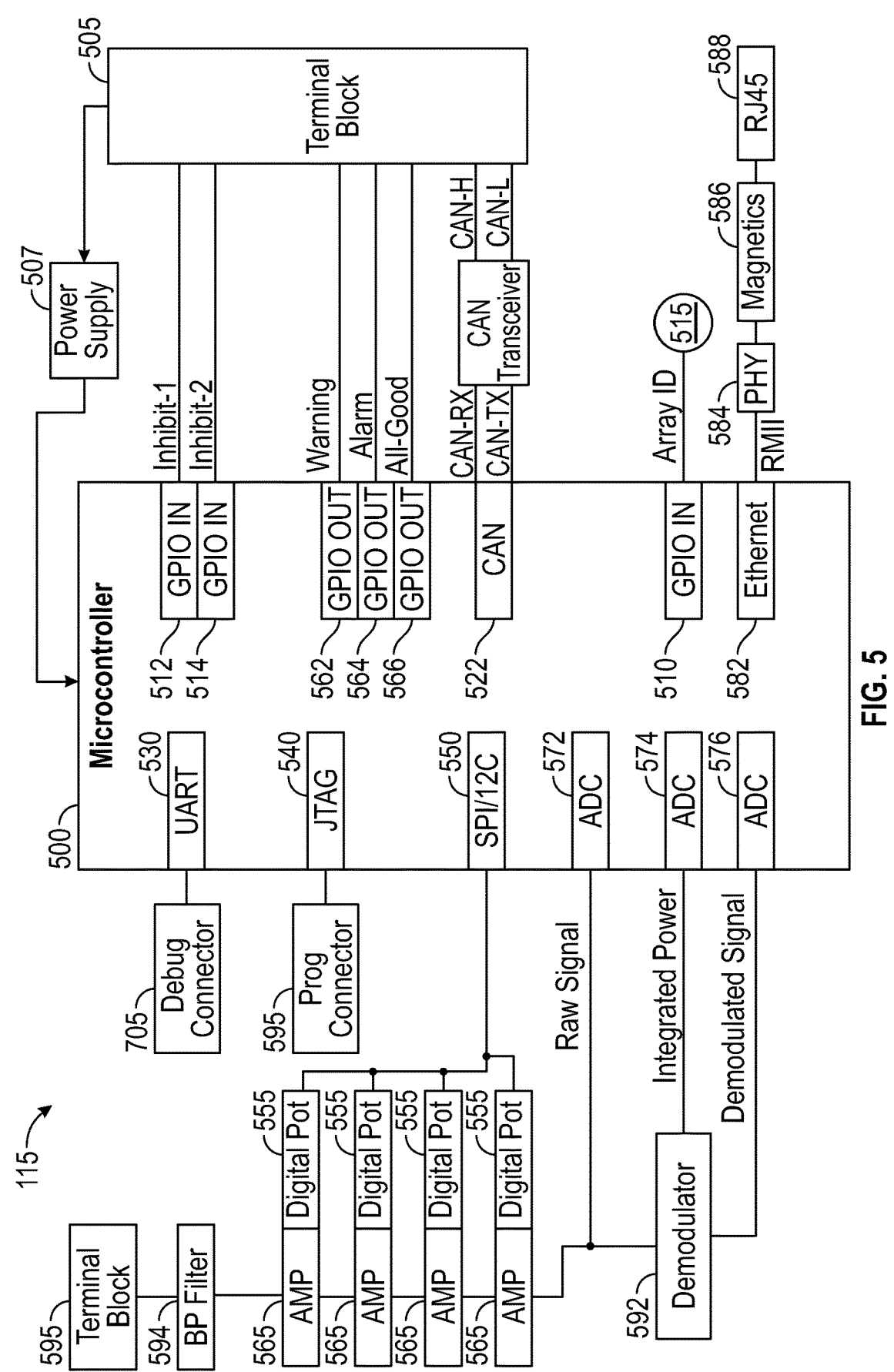
FIG. 5 illustrates a receiver for detecting a signal in a cable, according to an embodiment.

FIG. 5 illustrates a receiver 115 for detecting a signal in a cable 120, according to an embodiment. Although only a certain number of each component of receiver 115 is illustrated, it should be understood that receiver 115 may comprise any number of each component, including one or any plurality of each component. In addition, one or more of the components may be omitted from receiver 115 and/or one or more non-illustrated components may be included in receiver 115. Receiver 115 may comprise a circuit board, with all or a subset of the other components mounted on or otherwise connected to the circuit board.

Receiver 115 may comprise a microcontroller 500 configured for control in receiver 115. Microcontroller 500 may be identical to microcontroller 400 (e.g., STM32F407), although different inputs and/or outputs may be used. Therefore, any description of microcontroller 400 may apply equally to microcontroller 500, and vice versa.

Receiver 115 may comprise many of the same or similar components as transmitter 135. For example, receiver 115 may comprise a terminal block 505, which like terminal block 405, is configured to receive input power from an external power source (e.g., from an external AC-DC converter onboard mobile equipment 110). Terminal block 505 provides the input power (e.g., 24V), through a power supply 507, to microcontroller 500 and other components of receiver 115, to thereby power receiver 115. In addition, receiver 115 may comprise a debug connector 535 communicatively coupled to microcontroller 500 via UART interface 530, which may be identical to debug connector 435 and UART interface 430, respectively. Receiver 115 may also comprise a programming connector 545 communicatively coupled to microcontroller 500 via JTAG interface 540, which may be identical to programming connector 445 and JTAG interface 440, respectively. Accordingly, these components will not be redundantly described herein.

Receiver 115 may comprise a terminal block 595 that comprises a radio frequency (RF) input connector configured to receive a raw signal from antenna 112. It should be understood that this raw signal may represent a signal 140 that was detected by antenna 112. The raw signal that is input into terminal block 595 travels through a bandpass filter 594 that filters out frequencies outside the frequency range(s) of interest. The filtered raw signal may then pass through one or more amplifiers 565 (e.g., four amplifiers 565 in the illustrated embodiment), which amplify the filtered raw signal. Microcontroller 500 can adjust the gain of each amplifier 565, individually, using a respective digital potentiometer 555 that is communicatively coupled to microcontroller 500 via SPI/I2C interface 550. The gains of amplifiers 565 may be adjusted using an automatic gain control (AGC) algorithm, executed by microcontroller 500, based on the integrated power signal and content of the demodulated signal, to balance detection range against noise immunity. The filtered and amplified raw signal is sampled by microcontroller 500 via an analog-to-digital converter 572.

The filtered and amplified raw signal is also supplied to a demodulator 592 on a parallel path. Demodulator 592 splits the filtered and amplified raw signal into integrated RF power, which is sampled by microcontroller 500 via an analog-to-digital converter 574, and the demodulated signal, which is sampled by microcontroller 500 via an analog-to-digital converter 576.

In addition to a power input, terminal block 505 may comprise one or more inputs that each receive an input system signal and/or one or more outputs that each output an output system signal. The system signals may be logically inverted, since the input power will pull them to a high level. In other words, a low voltage level may represent an active signal, and a high voltage level may represent an inactive signal. An action from controller 116 or microcontroller 500 may be required to change the state of each signal between inactive and active. Active low signals can have many parallel drivers.

The input system signals may comprise an Inhibit-1 signal, input to microcontroller 500 via GPIO input 512, and an Inhibit-2 signal, input to microcontroller 500 via GPIO input 514. The Inhibit-1 and Inhibit-2 signals that can be set to active (e.g., to a low level) to disable cable detection by receiver 115. If these signals are set to active, receiver 115 may stop providing output system signals to controller 116.

The output system signals may comprise a Warning signal, output by GPIO output 562, an Alarm signal, output by GPIO output 564, and an All-Good signal, output by GPIO output 566. The Warning signal may be set to active whenever microcontroller 500 detects a signal (e.g., an idle bit), but a data frame has not been extracted from the demodulated signal. A data frame will not be extracted, for example, if the detected signal is not signal 140, and therefore, contains no data frames, or contains data frames with no identifier or a non-matching identifier. The Alarm signal may be set to active whenever microcontroller 500 detects cable 120. Microcontroller 500 may detect cable 120 whenever a signal is detected (e.g., preamble is detected) and a data frame with a matching identifier is extracted from the demodulated signal (i.e., payload is detected). The All-Good signal may be set to active whenever microcontroller 500 is fully functional.

In an embodiment, an array of receivers 115 may be connected together via a controller area network (CAN). In particular, each microcontroller 500 may comprise a CAN controller 522 that reads and writes to a CAN bus through terminal block 505. CAN controller 522 may receive signals from a CAN transceiver 524 and transmit signals to CAN transceiver 524. These signals may comprise serial bits. When reading the CAN bus, CAN transceiver 524 may store bits, represented by the states of the CAN high (CAN-H) and CAN low (CAN-L) lines of the CAN bus, until a full message is received. This message can then be provided to CAN controller 522 as a signal representing serial bits. When writing to the CAN bus, CAN transceiver 524 may receive a message from CAN controller 522 as a signal representing serial bits, and convert them into states of the CAN-H and CAN-L lines of the CAN bus. Thus, all receivers 115 in the array may communicate with each other over the CAN bus.

In the array of receivers 115, one receiver 115 may serve as a main receiver, while all other receivers 115 may serve as subordinates. Each receiver 115 may be addressed using an identifier selector 515 connected to GPIO input 510. Identifier selector 515 may comprise a rotary encoder that can be used to set a digit (e.g., a 16-bit digit) that represents the address of the respective receiver 115. The address of the main receiver 115 may be a predefined address, such as "0". It should be understood that each receiver 115 in the array will have a different address, set via the respective identifier selector 515, and one receiver 115 in the array will have the main address.

Microcontroller 500 may comprise an Ethernet interface 582. Ethernet interface 582 may be connected to a physical later 584 via a reduced media-independent interface (RMII). Physical layer 584 may be connected to a standard RJ45 connector via magnetics 586. Thus, microcontroller may communicate with one or more external systems via Ethernet communications. For example, receiver 115 may be connected to an internal network of controller 116 and/or mobile equipment 110 to transmit and/or receive data to other devices on the network. Each receiver 115 may have a static Internet Protocol (IP) address, and may send messages to a single static IP address destination on a single port (e.g., representing controller 116). The IP addresses and ports may be configured using debug connector 535 or programming connector 545, and saved in an internal flash memory of microcontroller 500.

Figure 6:
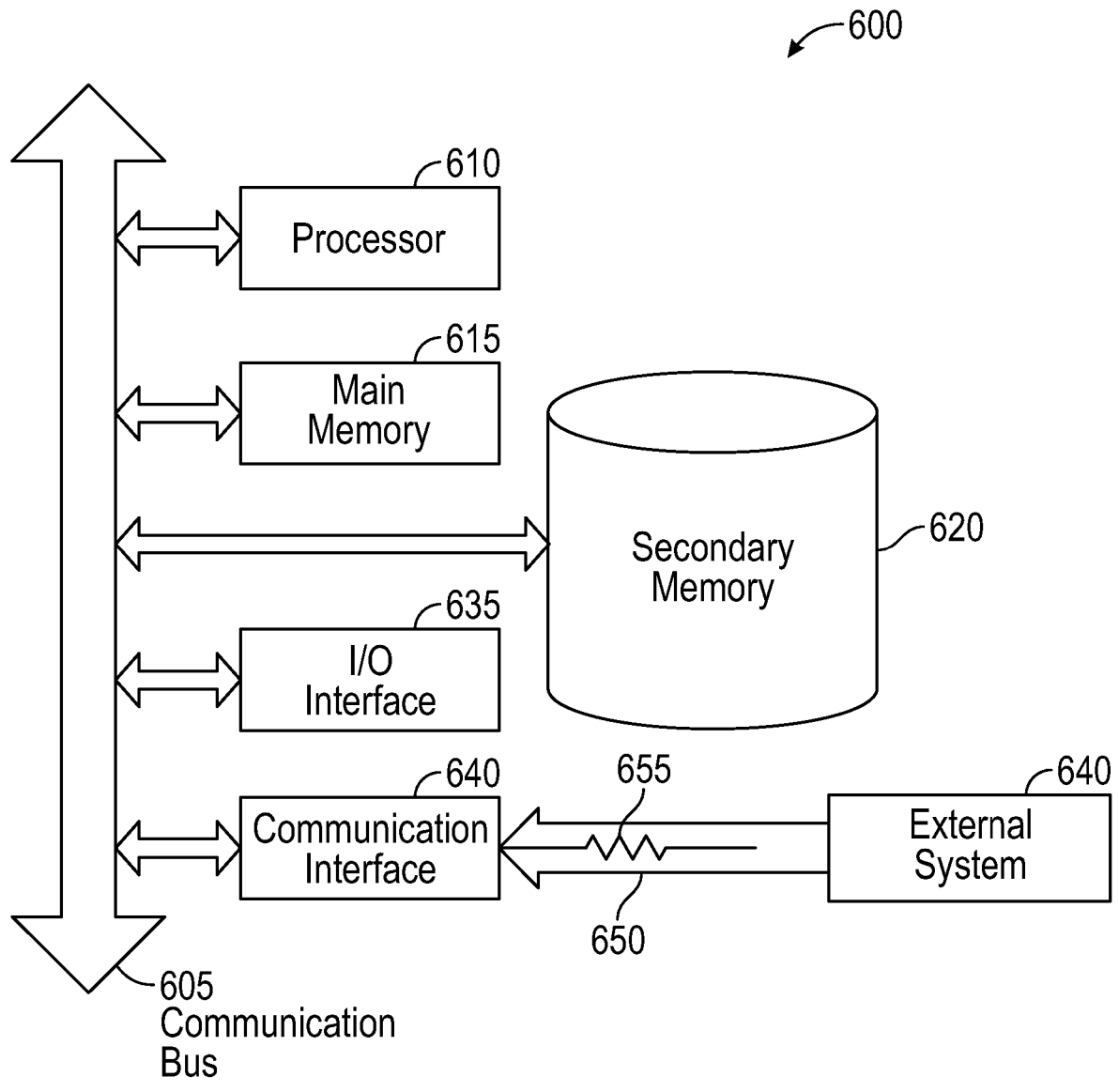
FIG. 6 illustrates an example of a controller, according to an embodiment.

FIG. 6 illustrates an example of controller 116, according to an embodiment. Controller 116 may comprise one or more processors 610. Processor(s) 610 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 610. Examples of processors which may be used with controller 116 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 610 may be connected to a communication bus 605. Communication bus 605 may include a data channel for facilitating information transfer between storage and other peripheral components of controller 116. Furthermore, communication bus 605 may provide a set of signals used for communication with processor 610, including a data bus, address bus, and/or control bus (not shown). Communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Controller 116 may comprise main memory 615. Main memory 615 provides storage of instructions and data for programs executing on processor 610, such as one or more of the processes or functions discussed herein. It should be understood that programs stored in the memory and executed by processor 610 may be written and/or compiled according to any suitable language, including without limitation C/C++, Java, JavaScript, Perl, Python, Visual Basic, .NET, and the like. Main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Controller 116 may comprise secondary memory 620. Secondary memory 620 is a non-transitory computer-readable medium having computer-executable code and/or other data (e.g., software implementing any process or function described herein) stored thereon. In this description, the term "computer-readable medium" is used to refer to any non-transitory computer-readable storage media used to provide computer-executable code and/or other data to or within controller 116. The computer software stored on secondary memory 620 is read into main memory 615 for execution by processor 610. Secondary memory 620 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Controller 116 may comprise an input/output (I/O) interface 635. I/O interface 635 provides an interface between one or more components of controller 116 and one or more input and/or output devices. For example, I/O interface 635 may receive the output of one or more sensors, and/or output control signals to one or more of the components of mobile equipment 110.

Controller 116 may comprise a communication interface 640. Communication interface 640 allows signals, such as data and software, to be transferred between controller 116 and external devices, networks, or other information sources and/or destinations (e.g., receiver(s) 115). For example, computer-executable code and/or data may be transferred to controller 116, over one or more networks, from a network server via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing controller 116 with a network or another computing device. Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 640 is generally in the form of electrical communication signals 655. These signals 655 may be provided to communication interface 640 via a communication channel 650 between communication interface 640 and an external system 645. In an embodiment, communication channel 650 may be a wired or wireless network, or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 615 and/or secondary memory 120. Computer-executable code can also be received from an external system 645 via communication interface 640 and stored in main memory 615 and/or secondary memory 620. Such computer-executable code, when executed by processor(s) 610, enable controller 116 to perform the various processes or functions disclosed herein.

INDUSTRIAL APPLICABILITY

On an industrial site, cables, such as trailing cables and/or buried cables, are at risk of being contacted by mobile equipment, such as surface mining equipment, excavation equipment, and/or the like. Accordingly, in embodiments, a transmitter 135 injects a signal 140 (e.g., with a frequency at or around 100 kHz) on a pilot wire 125 of each cable 120 to be avoided. The injection of signal 140 may be synchronized across a plurality of transmitters 135 (e.g., using GPS). Simultaneously, a cable detection system may be operated on each mobile equipment 110 that is at risk of contacting cable(s) 120, including tethered mobile equipment 110 that utilize trailing cables 120.

Each cable detection system may include at least one receiver 115 that receives detected signals from one or more antennas 112. The antenna(s) 112 are configured to detect the signal 140 injected into pilot wire 125 by transmitter 135. The antenna(s) 112 may be positioned, for example, in the vicinity of a work implement of mobile equipment 110, ground-engaging member of mobile equipment 110, and/or any other component of mobile equipment 110 that is at risk of contacting a cable 120. Each antenna 112 may comprise a loop antenna that is capable of detecting signal 140, regardless of the orientation of cable 120 with respect to the antenna 112.

Each receiver 115 may itself, or in conjunction with a controller 116, demodulate each detected signal into a data stream, determine whether or not the data stream (e.g., an identifier in a data frame extracted from the data stream) matches a reference, and when determining that the data stream matches the reference, initiate an alert to prevent contact with the detected cable 120. The alert may notify a human operator or autonomous system of the risk of contact with the cable 120, and/or automatically interlock a component of mobile equipment to prevent contact with the cable 120. The ability to detect cables 120 may enable each mobile equipment 110 on the industrial site, not only to avoid contact cables 120, but also track cable positions, plan a work pattern (e.g., for autonomous drilling or digging) that avoids those cable positions, and/or the like. Notably, disclosed embodiments work to detect cables 120 even when there is no visibility of cables 120.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of industrial context or with a particular type of mobile equipment. Hence, although the present embodiments are, for convenience of explanation, depicted and described as being implemented with surface mining or excavating equipment, it will be appreciated that it can be implemented for various other types of equipment, and in various other environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A cable detection system comprising:
one or more antennas, installed on a mobile equipment,
    wherein each of the one or more antennas is configured to detect a signal within a frequency range; and
a receiver configured to, under a condition where any of the one or more antennas detect the signal,
    demodulate the detected signal into a data stream,
    determine whether or not the data stream matches a reference, and
    under a condition where the determining determines that the data stream matches the reference, initiate an alert,
wherein the determining whether or not the data stream matches the reference includes:
    attempting to detect a preamble in the data stream,
    under a condition where not detecting the preamble in the data stream, determining that the data stream does not match the reference, and
    under a condition where detecting the preamble in the data stream, extracting a data frame from the data stream based on the preamble, and determining whether or not the data stream matches the reference by determining whether or not the data frame matches the reference.

2. The cable detection system of claim 1, wherein the determining whether or not the data frame matches the reference includes:
    extracting an identifier from a payload of the data frame;
    comparing the identifier to the reference;
    under a condition where the identifier matches the reference, determining that the data frame matches the reference; and
    under a condition where the identifier does not match the reference, determining that the data frame does not match the reference.

3. The cable detection system of claim 1, wherein the frequency range is between 90 and 110 kilohertz.

4. The cable detection system of claim 1, wherein the detected signal is demodulated based on on-off keying (OOK) modulation.

5. The cable detection system of claim 1, wherein each of the one or more antennas comprises at least one loop antenna.

6. A system comprising:
one or more of a cable detection system of claim 1; and
one or more transmitters that are each configured to transmit the signal along a pilot wire of at least one cable.

7. The system of claim 6,
wherein the one or more transmitters are a plurality of transmitters, and
wherein each of the plurality of transmitters is configured to transmit the signal at a timing that is synchronized with each of the other plurality of transmitters.

8. The system of claim 7, wherein each of the plurality of transmitters is configured to determine the timing according to a Global Positioning System (GPS)-disciplined clock.

9. The system of claim 7, wherein each of the plurality of transmitters is configured to modulate the signal using on-off keying (OOK) modulation.

10. The system of claim 7,
wherein each of the plurality of transmitters is configured to inject a stream of data frames, including said data frame that is extracted, into the signal, and
wherein each of the data frames comprises an identifier.

11. The system of claim 10, wherein the identifier in the data frames in the streams injected by all of the plurality of transmitters is identical.

12. A mobile equipment comprising a cable detection system of claim 1.

13. The mobile equipment of claim 12, wherein the alert comprises interlocking a work implement, such that the work implement is unable to move.

14. The mobile equipment of claim 12, further comprising one or more ground-engaging members, wherein at least one of the one or more antennas is located in front of at least one of the one or more ground-engaging members.

15. The mobile equipment of claim 12, wherein the mobile equipment comprises a trailing cable that supplies electrical power to the mobile equipment.

16. The mobile equipment of claim 15, wherein the mobile equipment comprises a cable reel to hold the trailing cable, and wherein each of the one or more antennas is shielded from the cable reel.

17. The mobile equipment of claim 15, wherein the trailing cable comprises a pilot wire on which the signal is transmitted.

18. A cable detection system comprising:
one or more antennas installed on a mobile equipment,
    wherein each of the one or more antennas is configured to detect a signal; and
a receiver including:
    a demodulator configured to demodulate the detected signal into a data stream, and
    a microprocessor configured to
        attempt to detect a preamble in the data stream,
        when not detecting the preamble in the data stream, determine that the data stream does not match a reference,
        when detecting the preamble in the data stream, extract a data frame from the data stream based on the preamble,
        extract an identifier from the data frame,
        compare the identifier to a reference identifier,
        when the identifier matches the reference identifier, determine that the data stream matches the reference, and

US 12,681,477 B2

17 when the identifier does not match the reference identifier, determine that the data stream does not match the reference, and when determining that the data stream matches the reference, initiate an alert.

19. A system comprising:

one or more cable detection systems; and a plurality of transmitters each configured to transmit a signal along a pilot wire of at least one cable at a timing that is synchronized with each of the other transmitters of the plurality of transmitters, wherein each of the one or more cable detection systems includes:

one or more antennas, installed on a mobile equipment, wherein each of the one or more antennas is configured to detect the signal within a frequency range; and a receiver configured to, under a condition where any of the one or more antennas detect the signal,

18 demodulate the detected signal into a data stream, determine whether or not the data stream matches a reference, and under a condition where the determining determines that the data stream matches the reference, initiate an alert.

20. The system of claim 19, wherein the determining whether or not the data stream matches the reference includes:

extracting an identifier from a payload of a data frame of the data stream, comparing the identifier to the reference, under a condition where the identifier matches the reference, determining that the data stream matches the reference, and under a condition where the identifier does not match the reference, determining that the data stream does not match the reference.

* * * * *